(12) United States Patent
Adapathya et al.

(10) Patent No.: US 7,385,587 B1
(45) Date of Patent: Jun. 10, 2008

(54) ASYMMETRICAL COMPUTER MOUSE DESIGN WITH EXTENDED THUMB BUTTON

(75) Inventors: Ravi S. Adapathya, Durham, NC (US); Brian H. Leonard, Durham, NC (US)

(73) Assignee: Lenovo (Singapore) Pte. Ltd., Singapore (SG)

( * ) Notice: Subject to any disclaimer, the term of this patent is extended or adjusted under 35 U.S.C. 154(b) by 838 days.

(21) Appl. No.: 09/404,182

(22) Filed: Sep. 24, 1999

(51) Int. Cl.
*G09G 5/08* (2006.01)

(52) U.S. Cl. .................. 345/163; 345/156; 345/157; 345/164; 345/165; 345/167

(58) Field of Classification Search .............. 345/163, 345/167, 156, 157, 164, 165
See application file for complete search history.

(56) References Cited

U.S. PATENT DOCUMENTS

| | | | | |
|---|---|---|---|---|
| 5,122,654 A | * | 6/1992 | Koh et al. ............... 340/710 |
| 5,287,090 A | * | 2/1994 | Grant ..................... 345/163 |
| 5,313,229 A | | 5/1994 | Gilligan et al. ........... 345/157 |
| 5,355,147 A | * | 10/1994 | Lear ...................... 345/163 |
| 5,374,942 A | | 12/1994 | Gilligan et al. ........... 345/157 |
| 5,530,455 A | * | 6/1996 | Gillick et al. ............. 345/163 |
| 5,648,798 A | * | 7/1997 | Hamling .................. 345/163 |
| 5,726,683 A | | 3/1998 | Goldstein et al. ........... 345/63 |
| D399,835 S | | 10/1998 | Goldstein et al. .......... D14/409 |
| 5,841,425 A | * | 11/1998 | Zenz, Sr. ................. 345/163 |
| 6,031,518 A | * | 2/2000 | Adams et al. ............. 345/156 |
| 6,193,196 B1 | * | 2/2001 | Hesley ................... 248/118 |

* cited by examiner

*Primary Examiner*—Xiao Wu
*Assistant Examiner*—Abbas Abdulselam
(74) *Attorney, Agent, or Firm*—Charles Munoz-Bustamante; Dillon & Yudell LLP

(57) ABSTRACT

An ergonomic computer mouse has an arcuate top surface, a front end, a rear end, and left and right sidewalls. The top surface has a circular side view profile that extends from the front end to the rear end and is contiguous with finger buttons on the mouse. The surface of the left or thumb sidewall is uniquely contoured for the left side of the user's hand and thumb. A large thumb ball support protrudes from the rear half of the left sidewall at an incline. The thumb ball support and rear end have a circular shape when viewed from above. The left sidewall also has a concave thumb channel for the thumb of the user. An elongated thumb button is located above the thumb channel in order to avoid accidental thumb button actuations. The mouse also has a pair of finger buttons and a scroll tab at the front of its top surface. Each of these features on the mouse are ergonomically designed to conform to the natural shapes and positions of the user's hand during use.

51 Claims, 5 Drawing Sheets

ASYMMETRICAL COMPUTER MOUSE DESIGN WITH EXTENDED THUMB BUTTON

BACKGROUND OF THE INVENTION

1. Technical Field

This invention relates in general to a computer mouse and in particular to an asymmetrical, ergonomically enhanced computer mouse design with an extended thumb button that is intended for right-handed use.

2. Background Art

Computer mice typically have an elongated, puck-like shape with two buttons on a front top surface for use by the index and middle fingers. Some prior art "one-size-fits-all," right-handed computer mice, such as the mouse described in U.S. Pat. No. 5,530,455, have a button on their left side wall that is intended for use by the thumb. Although the thumb button provides a valuable function, a portion of the population of mouse users finds it difficult to use effectively due to the placement and size of the button.

With respect to placement, prior art thumb buttons are co-located at or near the natural point of contact with the user's thumb on the side of the mouse. As the mouse is moved about the mousepad to reposition the computer cursor, the thumb button is prone to be inadvertently depressed or "clicked" since the button is located at or near the natural point of contact of the thumb. Unwanted button clicks reduce the efficiency of the mouse device by increasing user errors and frustration. With respect to the size of the thumb button, it is typically too small to accommodate the wide variation in the location of users' thumbtips that result from the wide range of hand sizes that characterize the user population of a "one-size-fits-all" design. A user with relatively small or large hands must reposition their hand either forward or backward, respectively, or flex their thumb in order to reach and click the thumb button effectively.

Generally accepted ergonomics design recommendations for mouse devices suggest that a good design allows the user to avoid static and/or awkward postures while using the device. A static posture is one that is prolonged and unchanging over time. An awkward posture is one that forces the user to deviate substantially from a "neutral" position of a given body joint. In computer mouse design, the position of the wrist, finger, and thumb joints are of particular importance.

Therefore, it is a feature of the present invention to provide a computer mouse that is comfortable and allows a wide range of users to easily change the placement of their grip on the mouse without affecting performance.

It is another feature of the present invention to provide a computer mouse that minimizes the need for a wide range of users to maintain a static posture or grip on the mouse.

It is yet another feature of the present invention to allow a wide range of users to reach the mouse buttons without having to excessively flex their fingers and thumb into awkward positions.

SUMMARY OF THE INVENTION

An ergonomic computer mouse that has an arcuate top surface, a front end, a rear end, and left and right sidewalls. The top surface has a circular side view profile that extends from the front end to the rear end and is contiguous with finger buttons on the mouse. The surface of the left or thumb sidewall is uniquely contoured for the left side of the user's hand and thumb. A large thumb ball support protrudes from the rear half of the left sidewall at an incline. The thumb ball support and rear end have a circular shape when viewed from above. The left sidewall also has a concave thumb channel for the thumb of the user. An elongated thumb button is located above the thumb channel in order to avoid accidental thumb button actuations. The mouse also has a pair of finger buttons and a scroll tab at the front of its top surface. Each of these features on the mouse are ergonomically designed to conform to the natural shapes and positions of the user's hand during use. The intended population of users for this mouse are right-handed users of mice whose anthropometric characteristics match the profile of Western adult populations such as the United States, Canada, Great Britain, and Western Europe.

BRIEF DESCRIPTION OF THE DRAWINGS

So that the manner in which the features, advantages and objects of the invention, as well as others which will become apparent, are attained and can be understood in more detail, more particular description of the invention briefly summarized above may be had by reference to the embodiment thereof which is illustrated in the appended drawings, which drawings form a part of this specification. It is to be noted, however, that the drawings illustrate only a preferred embodiment of the invention and is therefore not to be considered limiting of its scope as the invention may admit to other equally effective embodiments.

BEST MODE FOR CARRYING OUT THE INVENTION

Figure 1:
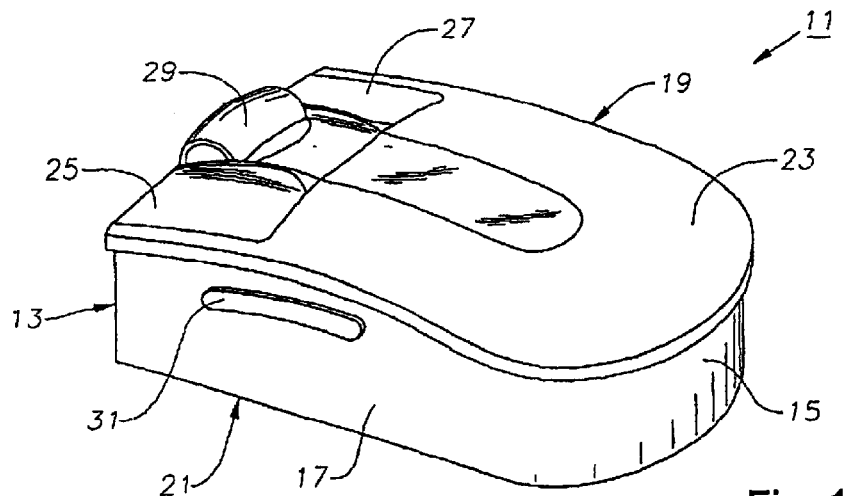
FIG. 1 is a rear isometric view of a prior art computer mouse.
Figure 2:
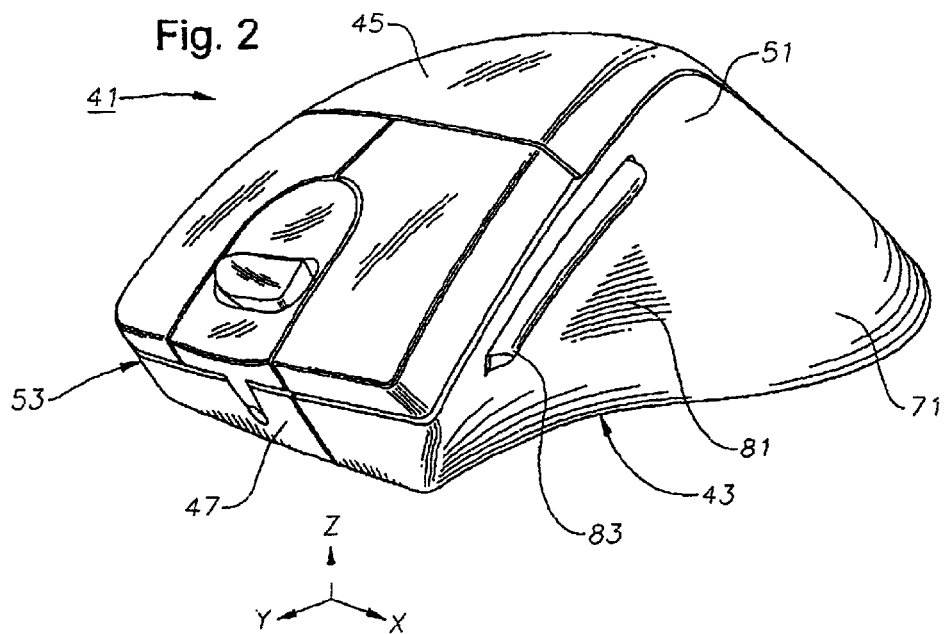
FIG. 2 is a front isometric view of a computer mouse constructed in accordance with the invention.
Figure 3:
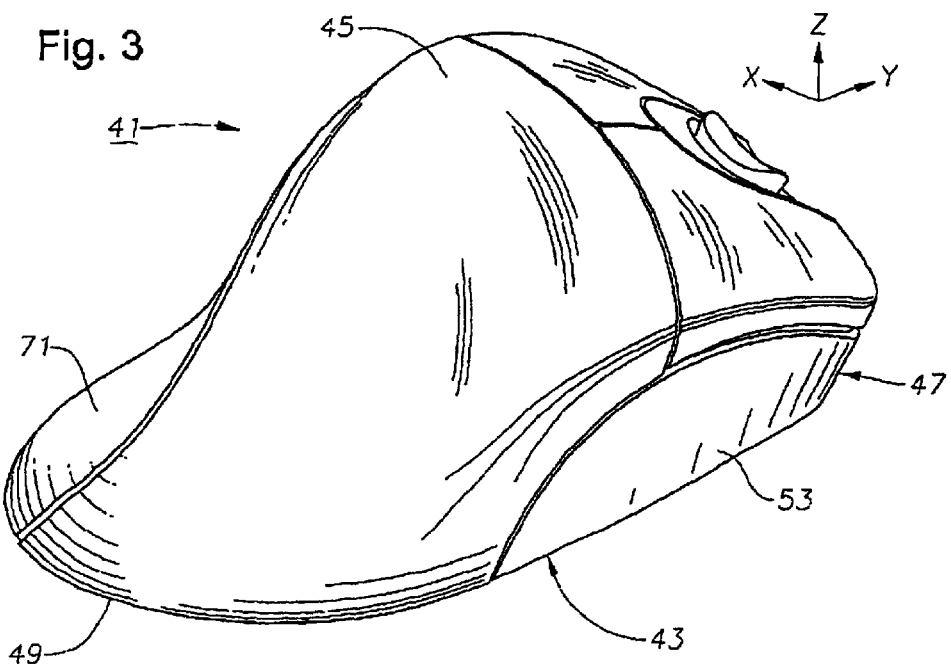
FIG. 3 is a rear isometric view of the mouse of FIG. 2.

Referring to FIG. 1, a prior art computer mouse 11 is shown. Mouse 11 has a front end 13, a rear end 15, a left sidewall 17, and a right sidewall 19. Mouse 11 also has a bottom surface 21 and a top surface 23. Sidewalls 15, 17 are substantially parallel to each other and orthogonal to front end 13 and bottom surface 21. Thus, mouse 11 is generally rectangular in shape, but has some rounded features like rear end 15. Top surface 23 has a pair of rectangular buttons 25, 27 that are adjacent to front end 13. Buttons 25, 27 are spaced apart by a scroll device 29 that is also adjacent to front end 13. Scroll device 29 manipulates pages of text on a computer screen by scrolling them up or down in response to manipulation by the user. Mouse 11 also has a third or thumb button 31 on its sidewall 17.

During use, the proximal portion of the user's palm rests on the support surface beneath mouse 11 rather than directly on mouse 11. The user's index, middle, and ring fingers extend forward to button 25, scroll device 29, and button 27, respectively. The user's thumb extends along sidewall 17. Thumb button 31 is located at or near the natural position that a user with an average sized hand would place their thumb during use. Thus, an average user's thumb would always be in contact with thumb button 31 when the user's hand is on mouse.

However, if the user had a large or small hand, their thumb would naturally contact sidewall 17 in front of or behind thumb button 31, respectively, if the user were to keep the proximal portion of their palm on the support surface. Consequently, a small-handed user would move their hand forward and on top of mouse 11 to an unnatural position to reach button 25, 27, scroll device 29, and thumb button 31. The small-handed user would also be required to flex their fingers and thumbs into arched configurations in order to manipulate those devices. A large-handed user would move their hand rearward so that their fingers and thumb would be adjacent to buttons 25, 27, 31, and scroll device 29. In addition, the large handed user's palm would be unsupported by top surface 23 since the proximal portion of their palm would be located well rearward of rear end 15. Such conditions would force the user to flex their fingers and thumb to actuate buttons 25, 27, 31.

Referring now to FIGS. 2–9, an improved ergonomic computer mouse 41 and Cartesian coordinate system is shown. Mouse 41 is a relatively large, "one-size-fits-all" mouse that is uniquely contoured to conform to a very broad range of sizes of the human hand. Mouse 41 has a flat bottom surface 43 in the x-y plane, an arcuate top surface 45, an inclined front end 47, a rounded rear end 49, and left and right sidewalls 51, 53.

Figure 4:
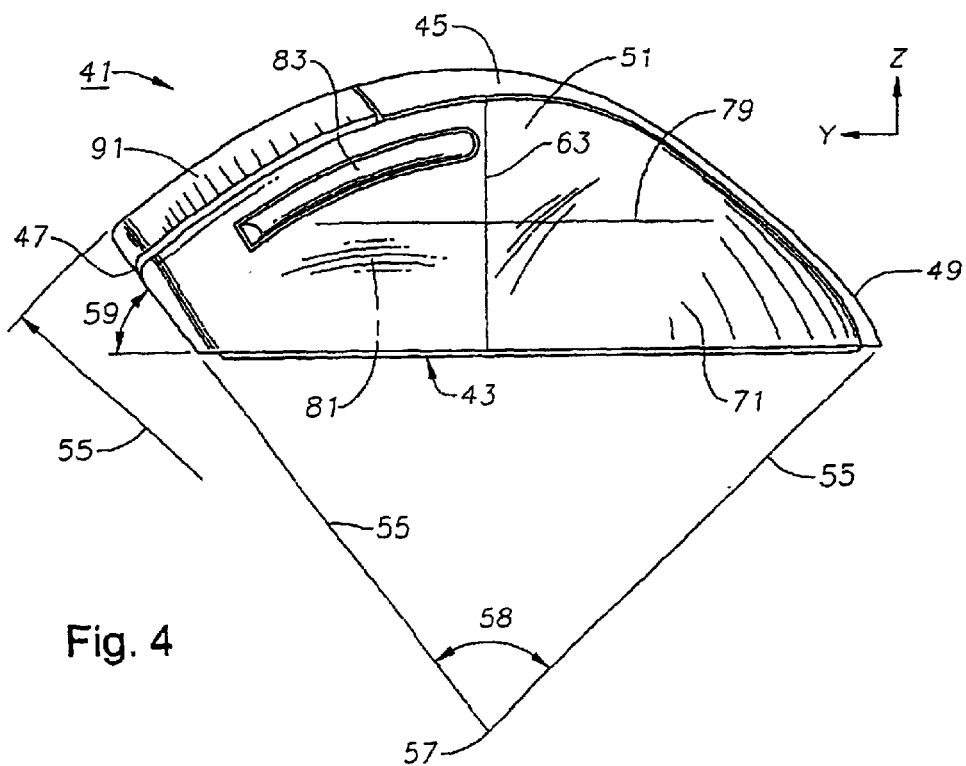
FIG. 4 is a left side view of the mouse of FIG. 2.
Figure 7:
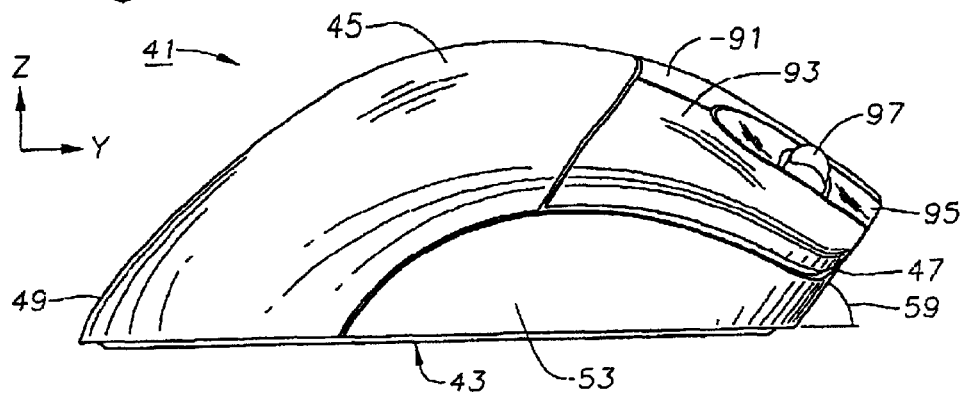
FIG. 7 is a right view of the mouse of FIG. 2.
Figure 8:
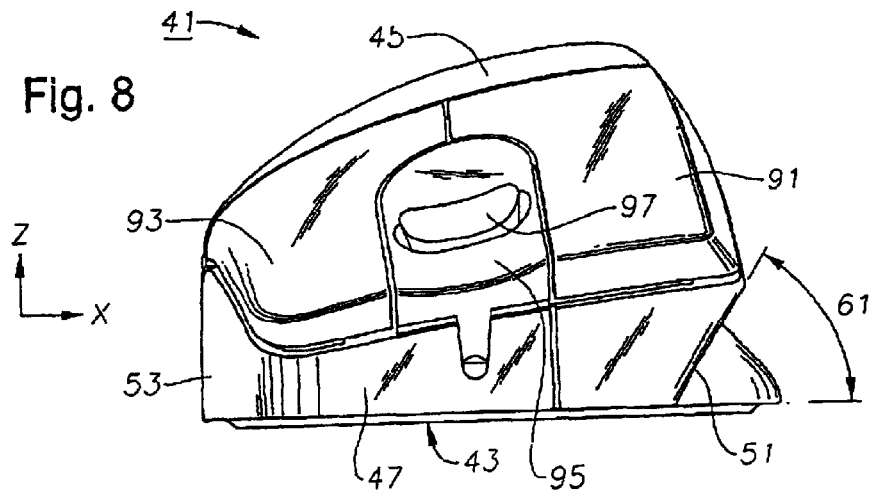
FIG. 8 is a front view of the mouse of FIG. 2.

As shown in FIGS. 4 and 7, the side view profile of top surface 45 in the y-z plane is substantially defined by a single radius 55 having an origin 57. In the embodiment shown, radius 55 has a length of about 3.0 inches. The arc 58 circumscribed by radius 55 extends from front end 47 all the way to rear end 49 for an arcuate segment of approximately 110 degrees relative to origin 57. Note how top surface 45 smoothly transitions into and is contiguous in profile with rear end 49 when viewed from the side. When viewed from above, top surface 45 also tapers or narrows in width from front to back. Front end 47 is inclined at an acute angle 59 (FIG. 4) from the x-y plane. In the embodiment shown, angle 59 is approximately 55 degrees. Angle 59 allows the front edge of the top surface 45 to be located forward of the front edge of the bottom surface 43, with the front end 47 being defined therebetween.

The surface of left sidewall 51 is uniquely contoured for the left side of the user's hand and thumb. The portion of sidewall 51 adjacent to front end 47 (FIGS. 2, 5, and 8) is angled forward at angle 59 (FIG. 4), and outward at an acute angle 61 in the x-z plane. In the embodiment shown, angle 61 is approximately 60 degrees. The inclination of sidewall 51 gradually increases as sidewall 51 transitions from front end 47 to rear end 49. At or about the y-axis midpoint of mouse 41 (indicated by vertical line 63 in FIG. 4), the inclination of sidewall 51 is substantially vertical (see FIGS. 6 and 9). Rearward of line 63, the inclination of sidewall 51 reverses to an obtuse angle or inward before gradually transitioning into rear end 49.

Figure 5:
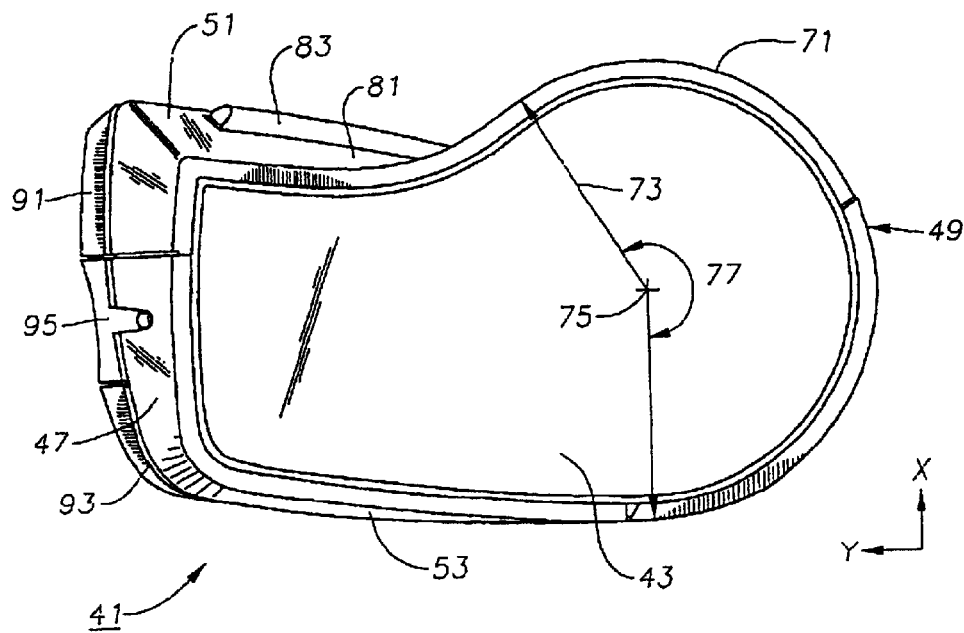
FIG. 5 is a bottom view of the mouse of FIG. 2.
Figure 6:
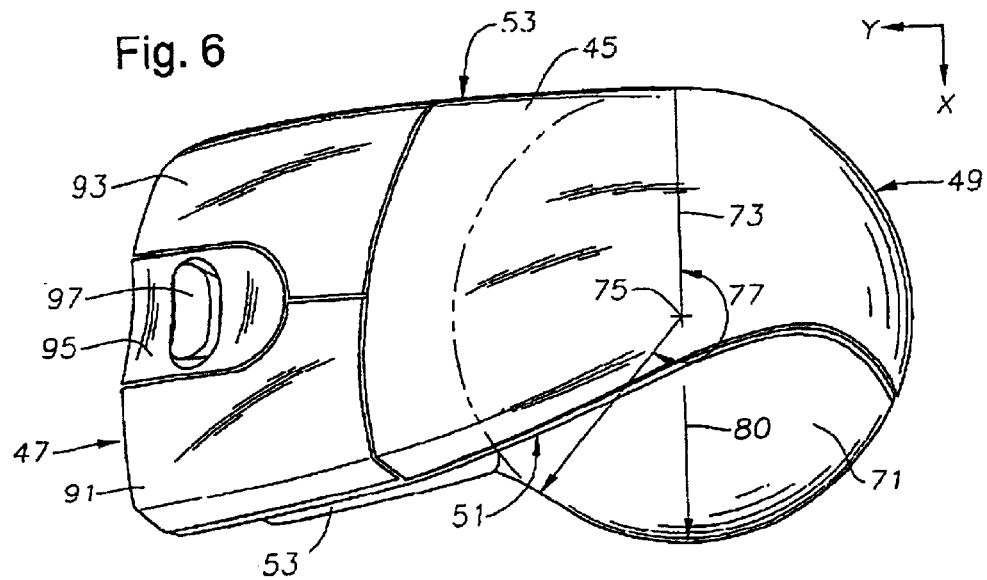
FIG. 6 is a top view of the mouse of FIG. 2.
Figure 9:
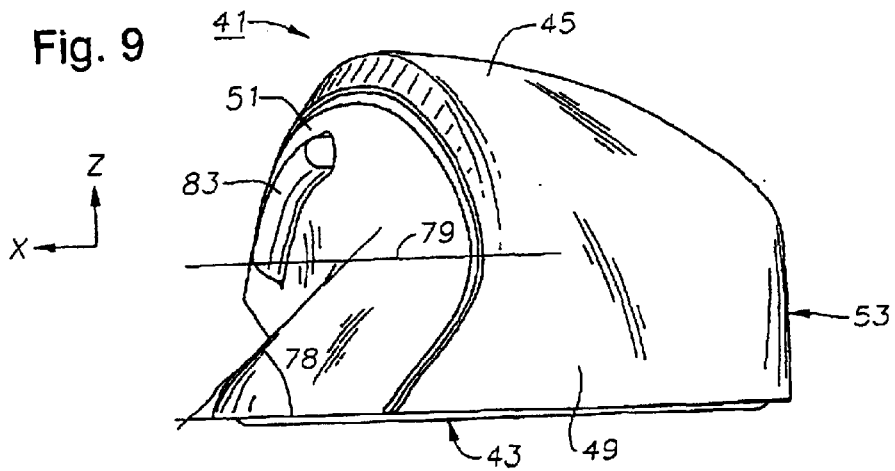
FIG. 9 is a rear view of the mouse of FIG. 2.
Figure 12:
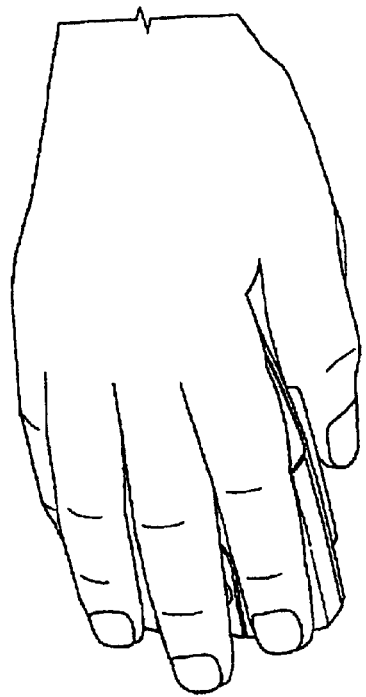
FIG. 12 is a top view of the mouse of FIG. 2 in operation.
Figure 13:
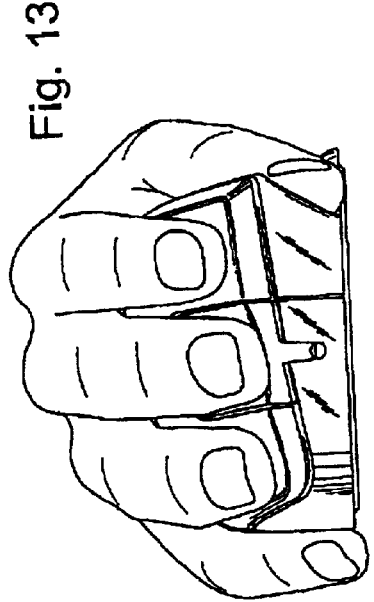
FIG. 13 is a front view of the mouse of FIG. 2 in operation.
Figure 10:
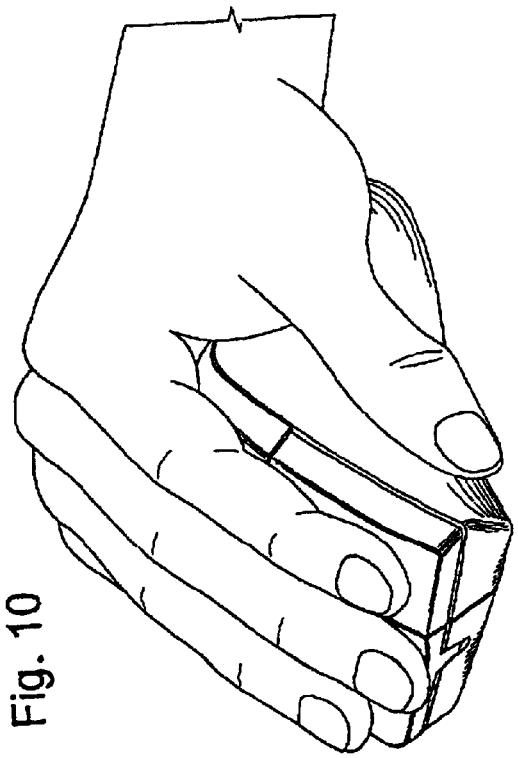
FIG. 10 is a front isometric view of the mouse of FIG. 2 in operation.
Figure 11:
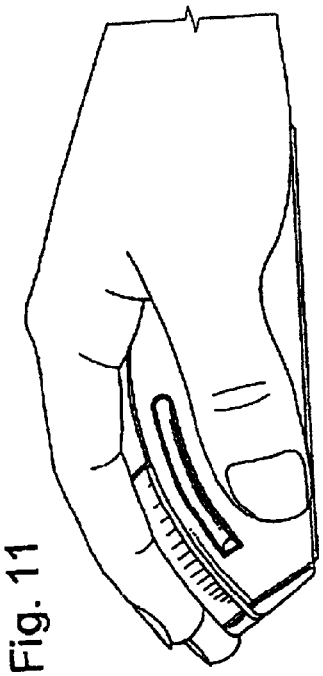
FIG. 11 is a left side view of the mouse of FIG. 2 in operation.

A large thumb ball support 71 protrudes from the rear half of sidewall 51 for supporting most but typically not all of the proximal end or "ball" of the thumb of the user where the thumb connects to the rest of the hand. A small portion (approximately 5 to 15%) of the user's hand immediately distal to the wrist joint is expected to rest upon the surface on which the mouse is used. As shown in FIGS. 5 and 6, the shape of thumb ball support 71 is substantially defined by a single radius 73 having an origin 75. In the embodiment shown, radius 73 has a length of about 1.5 inches. The arc 77 circumscribed by radius 73 extends completely around the rear end 49 of mouse 41 for an arcuate segment of approximately 225 degrees relative to origin 75. Note how thumb ball support 71 smoothly transitions into rear end 49. Thumb ball support 71 is tapered at an angle 78 (FIG. 9) in the x-z plane. Angle 78 is approximately 45 degrees. In addition, thumb ball support 71 is also located on the lower half of sidewall 51 below horizontal line 79 (FIGS. 4 and 9). The transition of sidewall 51 from front to back and the presence of thumb ball support 71 define a distinctly concave thumb channel 81. Thumb channel 81 is the location where the thumb of the user would naturally contact sidewall 51 regardless of the size of the user's hand.

Another unique characteristic of thumb ball support 71 is the extent of its protrusion 80 from sidewall 51 (see FIG. 6). At its maximum width, thumb ball support 71 accounts for more than 25% of the width of mouse 41 as measured from sidewall 51. In the embodiment shown, thumb ball support 71 comprises about 35% of the width of mouse 41 as measured in the x-direction from sidewall 53 to an edge of thumb ball support 71.

Located and extending immediately above thumb channel 81 is an elongated thumb button 83. Thumb button 83 is provided for convenient actuation by the thumb of the user, but is offset from the natural location of the user's thumb in order to avoid accidental or unwanted actuations of thumb button 83. In the embodiment shown, thumb button 83 is an arcuate, semi-cylindrical key that is approximately 1.5 inches long. The length and placement of thumb button 83 was determined by using data from tables of hand anthropometry to estimate the location of the thumb tip of a female with a $5^{th}$ percentile hand length (a user with small hands) and a male with a $95^{th}$ percentile hand length (a user with large hands) when holding mouse 41 in a lateral grip. The difference between these estimates of thumbtip location established the minimum length of thumb button 83, to which was added an approximately 70% buffer to accommodate variations in the exact placement of the user's hand on mouse 41, to avoid forcing the user to maintain a constant, unmoving static grip on mouse 41. The placement of thumb button 83 was set such that the majority of expected locations of a user's thumbtip on the mouse, after also accounting for the portion of the user's hand immediately distal to the wrist joint that is expected to rest upon the surface on which the mouse is used, would be such that the user could easily activate the button with minimal, if any, requirement to flex the thumb or change the placement of their grip on the mouse.

Mouse 41 also has a pair of finger buttons 91, 93 located at the interface between top surface 45 and front end 47. Buttons 91, 93 are generally rectangular, but they are tapered and contoured to precisely follow the shapes of the other elements of mouse 41, such that they are contiguous with the profile of top surface 45. The inner lateral side edges of buttons 91, 93 partially abut each other adjacent to top surface 45, but are spaced apart by a stationary, concave detent 95 for the rest of their lengths. A stationary scroll tab 97 protrudes out of a hole in detent 95. Scroll tab 97 manipulates the images displayed on a computer screen by scrolling them in any direction in response to manipulation by the user. As shown in FIGS. 10–13, mouse 41 is ergonomically designed to conform to the natural shapes and positions of a user's hand during use.

The invention has several advantages. The mouse minimizes the thumb placement and size problems of thumb buttons on prior art mice. The extended thumb button of the invention is located above the natural resting place of the user's thumb to minimize unwanted button clicks and thereby increase the efficiency of the mouse device. Also, the length and placement of the thumb button is designed to allow a majority of users across a wide range of hand sizes to use the thumb button with minimal, if any, requirement to flex their thumb or change placement of their grip on the mouse. In addition, the improved size and placement of the thumb button minimize the need to maintain a static grip on the mouse, thereby freeing a user to reposition his hand gradually over time during use of the mouse while maintaining proximity to the button. Moreover, the unique, ergonomic shape of the mouse provides a more comfortable, user-friendly design than prior art mice. Again, users can freely reposition their hands on the mouse in various locations while maintaining close proximity to the functional elements of the mouse.

While the invention has been shown or described in only some of its forms, it should be apparent to those skilled in the art that it is not so limited, but is susceptible to various changes without departing from the scope of the invention.

We claim:

1. An ergonomic computer mouse, comprising:
   a body having a bottom surface, a top surface, a front end, a rear end, a thumb sidewall, and an opposite sidewall;
   a plurality of finger buttons on the top surface of the body adjacent to the front end;
   a thumb ball support extending from a rearward portion of the thumb sidewall, the thumb ball support being adapted to support a proximal end of a thumb of a user where the thumb connects to a hand of the user;
   a concave thumb channel in the thumb sidewall located forward of the thumb ball support for receiving the thumb of the user; and
   a thumb button extending from the thumb sidewall and located above the thumb channel so that the thumb of the user will be free of contact with the thumb button when the thumb of the user is in the thumb channel.

2. The ergonomic computer mouse of claim 1 wherein the top surface of the body has an arcuate side view profile that is substantially defined by a single radius, and wherein the profile extends from the front end to the rear end.

3. The ergonomic computer mouse of claim 2 wherein the rear end of the body is substantially contiguous in shape with the profile of the top surface.

4. The ergonomic computer mouse of claim 2 wherein the finger buttons are substantially contiguous in shape with the profile of the top surface.

5. The ergonomic computer mouse of claim 2 wherein the profile of the top surface forms an arcuate segment of approximately 110 degrees.

6. The ergonomic computer mouse of claim 1 wherein a front edge of the top surface of the body is forward of a front edge of the bottom surface, and the front end extends from the front edge of the top surface to the front edge of the bottom surface.

7. The ergonomic computer mouse of claim 1 wherein the thumb sidewall is inclined outward at the front end of the body, and the thumb sidewall is inclined inward at the rear end of the body.

8. The ergonomic computer mouse of claim 1 wherein the thumb ball support has an arcuate top view profile that is substantially defined by a single radius.

9. The ergonomic computer mouse of claim 8 wherein the rear end of the body has an arcuate top view profile that is contiguous with the top view profile of the thumb ball support.

10. The ergonomic computer mouse of claim 9 wherein the thumb ball support and the rear end form an arcuate segment of approximately 225 degrees.

11. The ergonomic computer mouse of claim 1 wherein the thumb ball support tapers into the thumb sidewall at angle of approximately 45 degrees.

12. The ergonomic computer mouse of claim 1 wherein the thumb ball support extends from a lower portion of the thumb sidewall.

13. The ergonomic computer mouse of claim 1 wherein the body has a width measured from the opposite sidewall to an edge of the thumb ball support, and the thumb ball support comprises about 25 to 35% of the width of the body beyond the thumb sidewall.

14. The ergonomic computer mouse of claim 1 wherein the thumb button is arcuate in shape and about 1.5 inches long.

15. The ergonomic computer mouse of claim 1, further comprising a concave detent located between the finger buttons.

16. The ergonomic computer mouse of claim 15, further comprising a scroll tab extending from the detent, and wherein the finger buttons have inner lateral side edges that abut each other rearward of the detent.

17. An ergonomic computer mouse, comprising:
   a body having a bottom surface, a top surface, a front end, a rear end, a thumb sidewall, and an opposite sidewall, wherein the top surface has an arcuate side view profile that is substantially defined by a single radius, and wherein the profile extends from the front end to the rear end;
   a plurality of finger buttons on the top surface of the body adjacent to the front end;
   a thumb ball support extending from a rearward portion of the thumb sidewall and having an arcuate top view profile that is substantially defined by a single radius, the thumb ball support being adapted to support a proximal end of a thumb of a user where the thumb connects to a hand of the user;
   a concave thumb channel in the thumb sidewall located forward of the thumb ball support for receiving the thumb of the user; and
   a thumb button extending from the thumb sidewall and located above the thumb channel so that the thumb of the user will be free of contact with the thumb button when the thumb of the user is in the thumb channel.

18. The ergonomic computer mouse of claim 17 wherein the rear end of the body is substantially contiguous in shape with the profile of the top surface.

19. The ergonomic computer mouse of claim 17 wherein the finger buttons are substantially contiguous in shape with the profile of the top surface.

20. The ergonomic computer mouse of claim 17 wherein the profile of the top surface forms an arcuate segment of approximately 110 degrees.

21. The ergonomic computer mouse of claim 17 wherein a front edge of the top surface of the body is forward of a front edge of the bottom surface, and the front end extends from the front edge of the top surface to the front edge of the bottom surface.

22. The ergonomic computer mouse of claim 17 wherein the thumb sidewall is inclined outward at the front end of the body, and the thumb sidewall is inclined inward at the rear end of the body.

23. The ergonomic computer mouse of claim 17 wherein the rear end of the body has an arcuate top view profile that is contiguous with the top view profile of the thumb ball support.

24. The ergonomic computer mouse of claim 23 wherein the thumb ball support and the rear end form an arcuate segment of approximately 225 degrees.

25. The ergonomic computer mouse of claim 17 wherein the thumb ball support tapers into the thumb sidewall at angle of approximately 45 degrees.

26. The ergonomic computer mouse of claim 17 wherein the thumb ball support extends from a lower portion of the thumb sidewall.

27. The ergonomic computer mouse of claim 17 wherein the body has a width measured from the opposite sidewall to an edge of the thumb ball support, and the thumb ball support comprises about 25 to 35% of the width of the body beyond the thumb sidewall.

28. The ergonomic computer mouse of claim 17 wherein the thumb button is arcuate in shape and about 1.5 inches long.

29. An ergonomic computer mouse, comprising:
    a body having a bottom surface, a top surface, a front end, a rear end, a thumb sidewall, and an opposite sidewall, wherein the thumb sidewall is inclined outward at the front end of the body, and the thumb sidewall is inclined inward at the rear end of the body;
    a plurality of finger buttons on the top surface of the body adjacent to the front end;
    a thumb ball support extending from a rearward portion of the thumb sidewall, the thumb ball support being adapted to support a proximal end of a thumb of a user where the thumb connects to a hand of the user;
    a concave thumb channel in the thumb sidewall located forward of the thumb ball support for receiving the thumb of the user; and wherein
    the top surface, the rear end, and the finger buttons form a contiguous, arcuate side view profile that is substantially defined by a single radius and extends from the front end to the rear end.

30. The ergonomic computer mouse of claim 29 wherein the profile forms an arcuate segment of approximately 110 degrees.

31. The ergonomic computer mouse of claim 29 wherein a front edge of the top surface of the body is forward of a front edge of the bottom surface, and the front end extends from the front edge of the top surface to the front edge of the bottom surface.

32. The ergonomic computer mouse of claim 29 wherein the thumb ball support has an arcuate top view profile that is substantially defined by a single radius.

33. The ergonomic computer mouse of claim 32 wherein the rear end of the body has an arcuate top view profile that is contiguous with the top view profile of the thumb ball support.

34. The ergonomic computer mouse of claim 33 wherein the thumb ball support and the rear end form an arcuate segment of approximately 225 degrees.

35. The ergonomic computer mouse of claim 29 wherein the thumb ball support tapers into the thumb sidewall at angle of approximately 45 degrees.

36. The ergonomic computer mouse of claim 29 wherein the thumb ball support extends from a lower portion of the thumb sidewall.

37. The ergonomic computer mouse of claim 29 wherein the body has a width measured from the opposite sidewall to an edge of the thumb ball support, and the thumb ball support comprises about 25 to 35% of the width of the body beyond the thumb sidewall.

38. An ergonomic computer mouse, comprising:
    a body having a bottom surface, a top surface, a front end, a rear end, a thumb sidewall, and an opposite sidewall, wherein the thumb sidewall is inclined outward at the front end of the body, and the thumb sidewall is inclined inward at the rear end of the body;
    a plurality of finger buttons on the top surface of the body adjacent to the front end;
    a thumb ball support extending from a rearward portion of the thumb sidewall, the thumb ball support being adapted to support a proximal end of a thumb of a user where the thumb connects to a hand of the user;
    a concave thumb channel in the thumb sidewall located forward of the thumb ball support for receiving the thumb of the user; wherein
    the thumb ball support and the rear end of the body form a contiguous, arcuate top view profile with the rear end of the body that is substantially defined by a single radius; and wherein
    the body has a width measured from the opposite sidewall to an edge of the thumb ball support, and the thumb ball support comprises about 25 to 35% of the width of the body beyond the thumb sidewall.

39. The ergonomic computer mouse of claim 38 wherein the top surface of the body has an arcuate side view profile that is substantially defined by a single radius, and wherein the profile extends from the front end to the rear end.

40. The ergonomic computer mouse of claim 39 wherein the rear end of the body is substantially contiguous in shape with the profile of the top surface.

41. The ergonomic computer mouse of claim 39 wherein the finger buttons are substantially contiguous in shape with the profile of the top surface.

42. The ergonomic computer mouse of claim 39 wherein the profile of the top surface forms an arcuate segment of approximately 110 degrees.

43. The ergonomic computer mouse of claim 38 wherein a front edge of the top surface of the body is forward of a front edge of the bottom surface, and the front end extends from the front edge of the top surface to the front edge of the bottom surface.

44. The ergonomic computer mouse of claim 43 wherein the thumb ball support and the rear end form an arcuate segment of approximately 225 degrees.

45. The ergonomic computer mouse of claim 38 wherein the thumb ball support tapers into the thumb sidewall at angle of approximately 45 degrees.

46. The ergonomic computer mouse of claim 38 wherein the thumb ball support extends from a lower portion of the thumb sidewall.

47. An ergonomic computer mouse, comprising:
    a body having a bottom surface, a top surface, a front end, a rear end, a thumb sidewall, and an opposite sidewall, wherein the thumb sidewall is inclined outward at the front end of the body, and the thumb sidewall is inclined inward at the rear end of the body;
    a plurality of finger buttons on the top surface of the body adjacent to the front end, wherein the top surface, the rear end, and the finger buttons form a contiguous, arcuate side view profile that is substantially defined by a single radius and extends from the front end to the rear end;

a thumb ball support extending from a rearward portion of the thumb sidewall, the thumb ball support being adapted to support a proximal end of a thumb of a user where the thumb connects to a hand of the user, wherein the thumb ball support and the rear end of the body form a contiguous, arcuate top view profile with the rear end of the body that is substantially defined by a single radius;

a concave thumb channel in the thumb sidewall located forward of the thumb ball support for receiving the thumb of the user; and wherein the body has a width measured from the opposite sidewall to an edge of the thumb ball support, and the thumb ball support comprises about 25 to 35% of the width of the body beyond the thumb sidewall.

48. The ergonomic computer mouse of claim 47 wherein the profile of the top surface forms an arcuate segment of approximately 110 degrees.

49. The ergonomic computer mouse of claim 47 wherein a front edge of the top surface of the body is forward of a front edge of the bottom surface, and the front end extends from the front edge of the top surface to the front edge of the bottom surface.

50. The ergonomic computer mouse of claim 47 wherein the thumb ball support and the rear end form an arcuate segment of approximately 225 degrees.

51. The ergonomic computer mouse of claim 47 wherein the thumb ball support tapers into the thumb sidewall at angle of approximately 45 degrees.

\* \* \* \* \*